United States Patent
Wynn

(10) Patent No.: US 6,550,058 B1
(45) Date of Patent: Apr. 15, 2003

(54) STACK CLEARING DEVICE AND METHOD

(75) Inventor: Allen C. Wynn, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/497,606

(22) Filed: Feb. 3, 2000

(51) Int. Cl.[7] .............................................. G06F 9/45
(52) U.S. Cl. ...................... 717/158; 717/154; 717/130
(58) Field of Search ................................ 717/152, 157, 717/158, 159, 124, 127, 128, 130, 131, 132, 133, 154; 711/100, 103; 712/202; 713/189, 193, 194, 200, 201, 185

(56) References Cited

U.S. PATENT DOCUMENTS

| | | | |
|---|---|---|---|
| 3,889,243 A | | 6/1975 | Drimak |
| 4,485,435 A | | 11/1984 | Sibley |
| 4,751,636 A | | 6/1988 | Sibley |
| 5,193,180 A | * | 3/1993 | Hastings ..................... 717/163 |
| 5,293,385 A | * | 3/1994 | Hary ............................ 714/38 |
| 5,628,016 A | * | 5/1997 | Kukol .......................... 717/114 |
| 6,009,258 A | * | 12/1999 | Elliott ........................... 703/22 |
| 6,085,029 A | * | 7/2000 | Kolawa et al. ................ 714/38 |
| 6,189,141 B1 | * | 2/2001 | Benitez et al. ............... 717/153 |
| 6,260,187 B1 | * | 7/2001 | Cirne ........................... 717/110 |
| 6,351,843 B1 | * | 2/2002 | Berkley et al. ............. 709/332 |
| 6,385,727 B1 | * | 5/2002 | Cassagnol et al. .......... 713/193 |
| 2001/0056539 A1 | * | 12/2001 | Pavlin et al. ................ 713/193 |

OTHER PUBLICATIONS

"Secure Deletion of Data from Magnetic and Solid–State Memory", Gutmann, Peter, Department of Computer Science, University of Auckland, Jul. 1996, retrieved from http://www.cs.auckland.ac.nz/~pgut001/pubs/secure_del.html, May 21, 2002.*

* cited by examiner

Primary Examiner—Tuan Q. Dam
Assistant Examiner—Mary J. Steelman
(74) Attorney, Agent, or Firm—Robert H. Frantz; David A. Mims, Jr.

(57) ABSTRACT

A method for removing residual data from a computer program stack prior to returning control to a calling or controlling process with system and method for automatic inclusion thereof into software application programs at the time of production of executable code. Two methods, one for removing residual data from a relatively small stack frame and another for removing residual data from a large stack frame, are automatically inserted into application program code during an enhanced compiling method. Two compiler controls allow a software designer to globally include the stack cleaning feature in all code being produced, or to selectively include the stack cleaning feature into certain indicated modules, code areas, or procedures.

36 Claims, 3 Drawing Sheets

*Prior Art*

STACK CLEARING DEVICE AND METHOD

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

1. Field of the Invention

This invention pertains to the arts of computer program technologies, program execution methods, and multitask program management techniques. More particularly, this invention relates to program stack management for computer program operating systems and computer program compilers.

2. Description of the Related Art

A computer program process may "call" another process or subroutine to be executed on the same or by the same processor which is executing the "calling" process. When the "call" operation or instruction is executed, the execution of the "calling" process is halted at the point of the "call" instruction, and the "called" process or subroutine is initialized and executed.

In order to allow the "called" process or subroutine to fully utilize all or part of the processor's computing resources, including the processor's registers, and in order to preserve the context of the "calling" process, a program stack is used. A stack in a computer system is a data structure disposed in a computer-readable memory which dynamically stores variable and processor state information between process calls and returns.

The stack has a "first-in-last-out" ("FILO") structure. As data is placed into it, or "pushed onto the stack", older data is pushed further into the structure. As shown in FIG. 1, a processor (1) has a bi-directional data bus (3) to the stack memory (2). Often, the stack memory and bi-directional data bus is integrated into the processor microchip itself.

At the assembly language level, most processors have a "push" operation which will copy data from a processor register or memory location to the top of the stack, and will adjust the top-of-stack pointer appropriately. Conversely, a "pop" operation will copy data from the top of the stack into a processor register or memory location, and will adjust the top-of-stack pointer. Some processors implement the stack in an incrementing address fashion, such that "pushes" result in increases in the stack pointer value, and "pops" result in decreases in the stack pointer value. Other processors may take the opposite approach, but achieve identical functionality, including adding data to the bottom of the stack rather than the top of stack. These variations of conventions for stack handling and construction are well understood in the art.

When the processor executes a "call" operation, an automatic "push" of the contents of the program counter register is made, thereby storing the return address of the calling process on the stack. When the called operation or subroutine executes a "return" operation, an automatic "pop" of the top of the stack contents is made to the program counter, which restores the program counter to the return address of the calling process or routine.

When a function call is made from a high-level language ("HLL"), such as "C", the compiler generates assembly language representing the higher-level statements in the HLL to implement the source code into assembly code. When a function or routine call includes arguments to be passed to and returned from the function or routine, the compiler injects not only the assembly "call" opcode into the assembly language, but also a block of code to store the argument values on the stack, as well. This block or sequence of assembly language instructions may include several "pushes", or special write or store operations, to the stack. Also, in typical HLL compilers, the processor context may be stored on the stack as part of the function or subroutine call operation. The context of the processor typically includes volatile processor register values, such as interrupt control registers, indirect addressing registers and other control registers. A processor-specific example of a volatile register which is stored as part of the context save is the ECX register of an Intel x86 processor.

When a subroutine is initialized as the result of a "call" operation, it typically sets up a local stack frame for data variables which are local to the subroutine. These local variables are usually addressed by an offset from the beginning of the local stack frame, commonly stored in a "base" register, such as BP or EBP on an Intel x86 processor. In addition, sometimes temporary or transient values are stored on the stack dynamically within the subroutine, rather than including them as part of the local stack frame.

As shown in FIG. 2, if executing Process A (20) calls Process B, the return address and context of the processor for Process A is pushed (21) onto the stack, and the pointer for the top of the stack is moved to the "top" of the memory containing the Process A context data (203). Further, space is created on the "top" of the stack for Process B's local variables and the top of stack is adjusted (204). Execution of Process B then takes place (22), until Process B calls Process C. At this time, the processor pushes the processor context onto the stack for Process B's current state (23), and moves the top of stack pointer appropriately (205) then the top of stack is adjusted to make room for process C's local variables (206) to make room for Process C's local variables.

When Process C completes its execution, it will typically execute a "return" operation, which causes the processor to move the top of stack pointer down to Process B's area (202), and to "pop" or read the processor register values from the stack area for Process B (25). The register values are restored to B's state, and the software for Process B is resumed execution (22) from the point of the "call" operation in Process B's instruction code. When Process B completes its execution, a similar "return" operation is made, the top of stack pointer is moved downward (202), and the context for Process A is restored (26) so that Process A's execution (20) can resume and the point of the "call" instruction in Process A's code. This type of general stack operation is well known within the art.

It well known within the art that the stack can be implemented in computer memory in linear, contiguous memory space, or it may be implemented as a distributed linked list of sections of memory space, while still providing the same functionality as described supra. Additionally, some computer systems "push" data onto the stack in incrementing address values (which results in "pops" decreasing the address values), while other systems "push" data onto the stack in decrementing address values (and "pops" increase the address value). Further, systems which run operating systems may contain the stack management functionality in operating system modules in order to free the application software from stack management, which in simpler systems, stack management may be handled directly by the application software modules. These variations of the pointer management do not affect the FILO operation of the stack, and are merely alternate implementations of the same structure.

Upon closer examination of this type of stack management process, a potential operation and security problem is apparent. When an application starts execution, the memory used for the stack segment is typically initialized to all zeros. However, after some period of execution, there is stale or non-zero data on the unused portion of the stack Table 1 shows a example calling sequence to be used to illustrate the problem.

TABLE 1

Sample Calling Sequence

Proc A
    Call Proc B(parms);
    Call Proc C(parms);
Proc B
    Call Proc C(parms);
    Call Proc D(parms);
Proc C
    Call Proc B(parms);
    Call Proc D(parms);
Proc D
    no calls;

In this example, if Proc A calls Proc B, which then calls Proc C, which then returns to Proc B, and which then returns to Proc A, there is stale information on the unused portion of the stack, such as the return address where Proc A called Proc B, the return address where Proc B called Proc C, any passed in parameters, some local (stack) data variables, etc.

This is problematic in three ways. First, this may represent a data security issue. After returning from a procedure call, even a call to a procedure in a dynamically linked library, all of the local data variables still exist on the stack. If the called procedure has done any sort of password decryption, built any filenames, etc., there is a potential for this information to be exposed to other processes because the data is still available in the memory.

Second, the stale data may present confusing trace information when analyzing local variables for program debug and diagnosis. When analyzing trace data where stack snapshots have been taken, or when debugging an application, it is not always clear if the local data variables contain stale data from a previous call, or have actually been initialized by the procedure.

Third, when analyzing the call-chain for system debug, the stale data may present misleading information. After some period of execution, it is not uncommon to have a developer attempt to determine the sequence of procedures which have called to get the application to the current point of execution. If the compiler saves and restores a base stack pointer (EBP or BP on the Intel X86 platform), then the developer can trace backwards using the base stack pointer. However, some compilers use special optimization (e.g. Visual Age's Optilink calling convention) which do not save/restore the base stack pointer. Also, some assembler language procedures do not save/restore the base stack pointer. If a procedure of this type has been called, then the base stack pointer chain on the stack is broken, and the developer cannot follow the call-chain back to the origin. In this case, the developer will typically perform the time-consuming process of dumping the stack and tediously analyze the stack in the hopes of reconstructing the call-chain. This is both time-consuming and not always successful, particularly in the case of circular or recursive calls (A calls B which calls A), or multiple branches leading to the same node (A calls B which calls C, but A can also call C directly).

Therefore, there is a need in the art for a method which reduces the likelihood that potentially sensitive data in not residually present in computer stack memory following the execution of a software process. Further, there exists a need in the art for a method which provides accurate and clear data and call-sequence evidence in stack memory to aid in effective program development and system operation debugging and diagnosis.

BRIEF DESCRIPTION OF THE DRAWINGS

The following detailed description when taken in conjunction with the figures presented herein present a complete description of the present invention.

SUMMARY OF THE INVENTION

Figure 1:
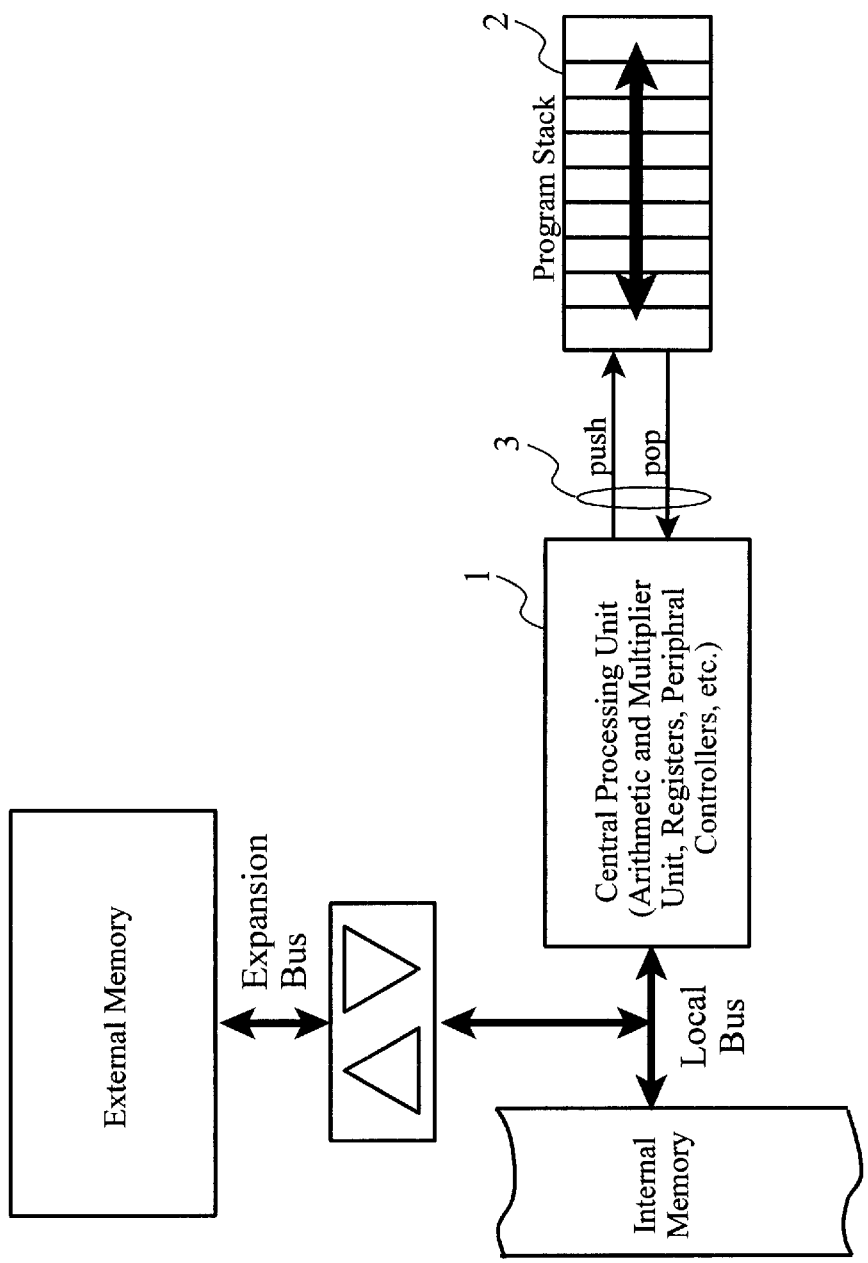
FIG. 1 shows the prior art relationship of central processing units and stack memory.
Figure 2:
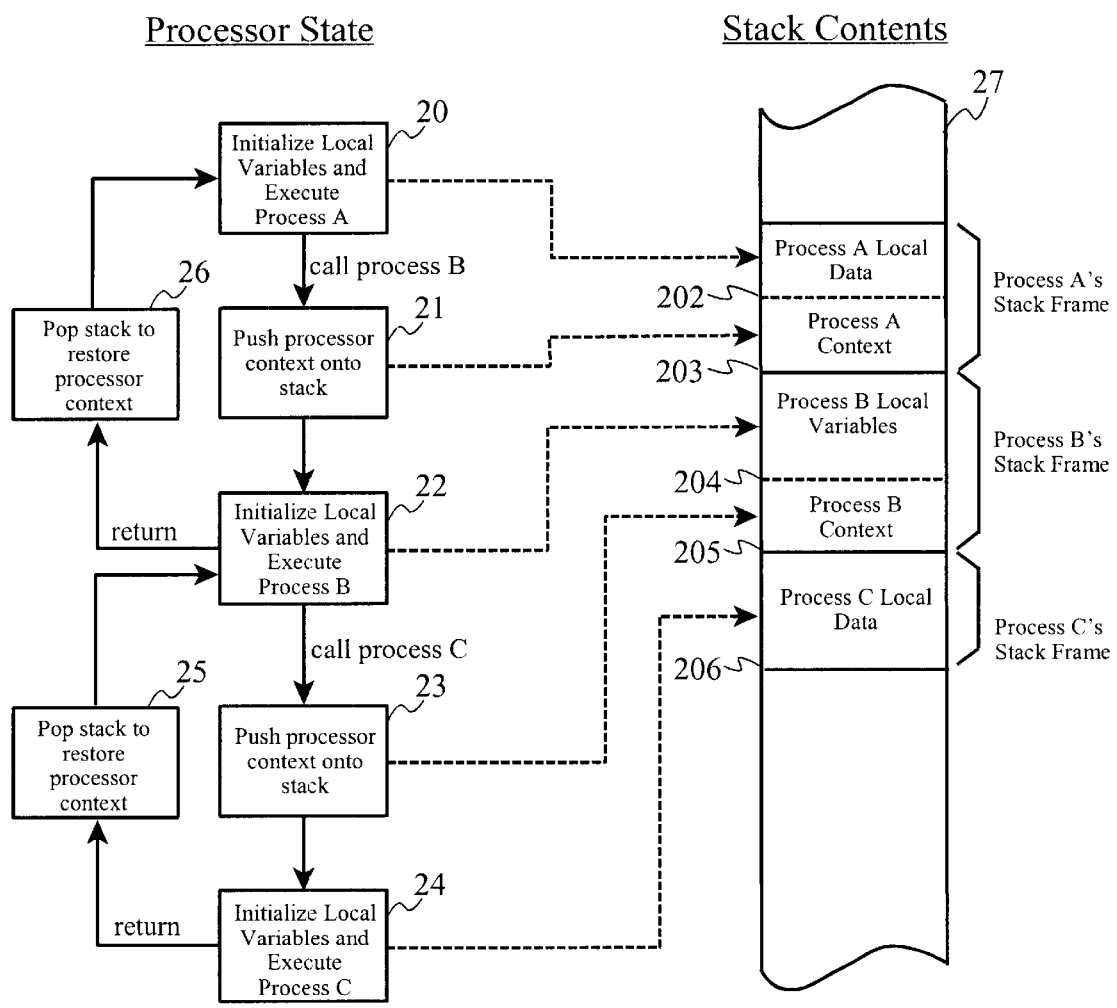
FIG. 2 illustrates the typical process of stack management related to program "call" and "return" operations.

The foregoing and other objects, features and advantages of the invention will be apparent from the following more particular description of a preferred embodiment of the invention, as illustrated in the accompanying drawings wherein like reference numbers represent like parts of the invention.

The invention employs a method which automatically re-initializes the memory used as stack space for a particular process or routine when the memory space is no longer needed by the process or routine. The preferred embodiment utilizes a compiler switch which directs the compiler to inject code (i.e. a "memset" operation) just before the "return" operation of each procedure, in order to re-initialize the stack space which the procedure previously used. This can be done via either intrinsic functions or executable code "in-lining" (e.g. adding a block of executable code into the procedure). Following the "call" operation of the calling routine or process, the compiler injects executable code which re-initializes the stack space which was used to pass the parameters to the called procedure, and which stored the return address to the calling procedure.

DETAILED DESCRIPTION OF THE INVENTION

The preferred embodiment of the invention is to realize the stack clearing and re-initialization method as a switch to a software compiler. Prior to starting the compile process, a software designer may elect to have the stack clearing and re-initialization code automatically injected into his or her code by setting an option, or "switch", in the compiler command file. Compilers often have many switches available to the user for various code execution time optimization options, memory usage and compactness options, and security and privilege options. In an alternate embodiment, the compile option may be implemented as a "#pragma" compiler directive, which allows the software designer to designate specific procedures, modules, or areas of code for which he wishes the stack clearing code to be injected.

In the preferred embodiment, the default value used to re-initialize the stack space is binary b'0, however, other values may be specified by the switch parameters.

Through having the stack clearing code injected into the application software by the compiler, application program data security will be maintained because local variables used by sensitive procedures will be overwritten before the procedure returns. Additionally, analysis of the local data variables when analyzing trace data or debugging is eased because they will not contain stale data. Further, analysis of call chain or call sequence is enhanced because only the return addresses in the direct call chain will be on the left stack.

Turning to TABLE 2, a procedure named VMFreeMem is shown. The procedure includes passed parameters, or arguments, followed by local variable declarations, then executable code ("..."), concluded by a "return" operation. For this example, assembly code compatible with an Intel X86 processor is shown, but it is equally applicable to any microprocessor available in the art. This procedure represents a procedure which leaves stale data on the stack following execution of the return operation, exhibiting the primary problem in the art today.

TABLE 2

Typical Procedure with Return Operation

| int | VMFreeMem (laddr, hobPTDA, fl) | |
|---|---|---|
| ulong_t | laddr; | /* Linear address */ |
| VMHOB | hobPTDA; | /* PTDA handle */ |
| ulong_t | fl; | /* Flags */ |
| { | | |
| VMOD | od; | /* Object data Structure */ |
| VMKHIB | khib; | /* Heap info buffer */ |
| SEL | sel; | /* Selector if heap */ |
| int | rc; | /* return code */ |
| ... | | /* executable code */ |
| return (rc); | | |
| } | | |

TABLE 3 shows an example of code to be modified including the point at which the compiler prior to the return operation. Generally, as most software modules proceed, there are statements to set up the stack frame, followed by actual functional code of the module, concluded with a series of operations to return the stack pointer (in this case several "pops") to its initial position before executing the "return" operation. Therefore, the code insertion point for the stack clearing method is located just prior to the actual "return" operation, as shown. When returning from the procedure call to VMFreeMem, both the local variables and any data resulting from intermediate pushes and pops during the execution of the called procedure are zeroed-out or re-initialized by the invention. Also, the return address and the parameters that have been pushed are re-initialized or cleared.

TABLE 3

Modified Procedure with Pre-Return Operation

| public | _VMFreeMem | |
|---|---|---|
| _VMFreeMem | proc | |
| push | ebp | |
| mov | ebp, esp | |
| sub | esp, 02ch | |
| push | ebx | |
| push | edi | |
| push | esi | |
| ... | | /* more executable code */ |
| pop | esi | |
| pop | edi | |
| pop | ebx | |
| mov | esp, ebp | |
| pop | ebp | |
| <Insertion Point 1> | | |
| ret | 0ch | |

No specific tag or marking in the code is necessary in the preferred embodiment for the insertion point to be recognized. Rather, if the compiler switch is set or if a #pragma is specified, the compiler will search and find all "return" instances, and perform the code insertion.

Depending on the size of the stack frame to be cleaned, there are two approaches in the preferred embodiment. For a large stack frame, TABLE 4 shows the sequence of operations of the injected code, which uses a "repeat store" operation to clear the stack frame which was used by the procedure. This is most efficient for large stack frames such as stack frames in which large arrays have been stored. For smaller stack frames, a series of simple "move" operations is used to clean the stack frame, as shown in TABLE 5. This is more efficiently executed if the block of stack memory to be cleared is relatively small. The instructions used in TABLES 4 and 5 are carefully chosen because none of them effect the processor flags. If any instructions which modify processor flags are used, the flag states must be saved and restored by the cleaning process, which is less efficient. In certain processors, however, the method may not be implementable without using instructions which modify the processor flags. In such a case, the flag status must be saved and restored appropriately.

TABLE 4

Pre-Return Operations for Large Stack Frames

| | ;Use REP STOSD |
|---|---|
| push eax | ; Save Return Code  −4 |
| push ds | ; Save DS  −4 |
| push edi | ; Save EDI  −4 |
| push ecx | ; Save ECX  −4 |
| mov eax, 0 | ; Set EAX ==0 |
| push ss | |
| pop ds | |
| lea edi, [esp−04h] | ; ds:edi points to past TOS |
| mov ecx, 11 | ; Number of dwords to overwrite |
| | ; (03ch−010h)/4==11 |
| rep stosd | ; overwrites used stack space |
| pop ecx | ; Restore ECX |
| pop edi | ; Restore EDI |
| pop ds | ; Restore DS |
| lea esp, [esp+4] | ; Adjust ESP for RC value |
| mov [esp−10h], eax | ; Zero location used to save ECX |
| mov [esp−0Ch], eax | ; Zero location used to save EDI |
| mov [esp−08h], eax | ; Zero location used to save DS |
| xchg eax, [esp4] | ; Restore return code and zero stack |

The method shown in TABLE 4 essentially saves the contents of the critical registers used for the procedure to pass back the return parameters to the calling procedure, then calculates the number of words on the stack to overwrite (the stack frame size), executes a "repeat store" operation to overwrite the value of zero (or other clearing value) in the stack frame, and restores the return procedure parameters to the registers and stack. When this code is injected as shown in TABLE 3, it is immediately followed by the "return" operation" leaving the returned parameters in the correct locations for the calling procedure to find and use, but leaving the rest of the stack frame cleaned and free of residual data.

TABLE 5

Pre-Return Operations for Small Stack Frames

| | |
|---|---|
| mov [esp-04h], eax | ; uses MOV's instead of REPSTO<br>; Save return code on stack<br>; without adjusting ESP |
| mov eax, 0 | |
| mov [esp-3ch], eax | |
| mov [esp-38h], eax | |
| mov [esp-34h], eax | |
| mov [esp-30h], eax | |
| mov [esp-2ch], eax | |
| mov [esp-28h], eax | |
| mov [esp-24h], eax | |
| mov [esp-20h], eax | |
| mov [esp-1ch], eax | |
| mov [esp-18h], eax | |
| mov [esp-14h], eax | |
| mov [esp-10h], eax | |
| mov [esp-0ch], eax | |
| mov [esp-08h], eax | |
| xchg [esp-4], eax | ; Restore return code while<br>; zeroing out last DWORD |

As shown in TABLE 5, the process for cleaning a small stack frame is essentially the same as the process for cleaning a large stack frame, first saving the contents of the volatile registers which contain the called procedure's return parameters, overwriting the stack frame contents, and then restoring the contents of the volatile registers. However, in this case, a series of simple "move" operations are employed to achieve the overwriting function instead of a "repeat store" operation.

Figure 3:
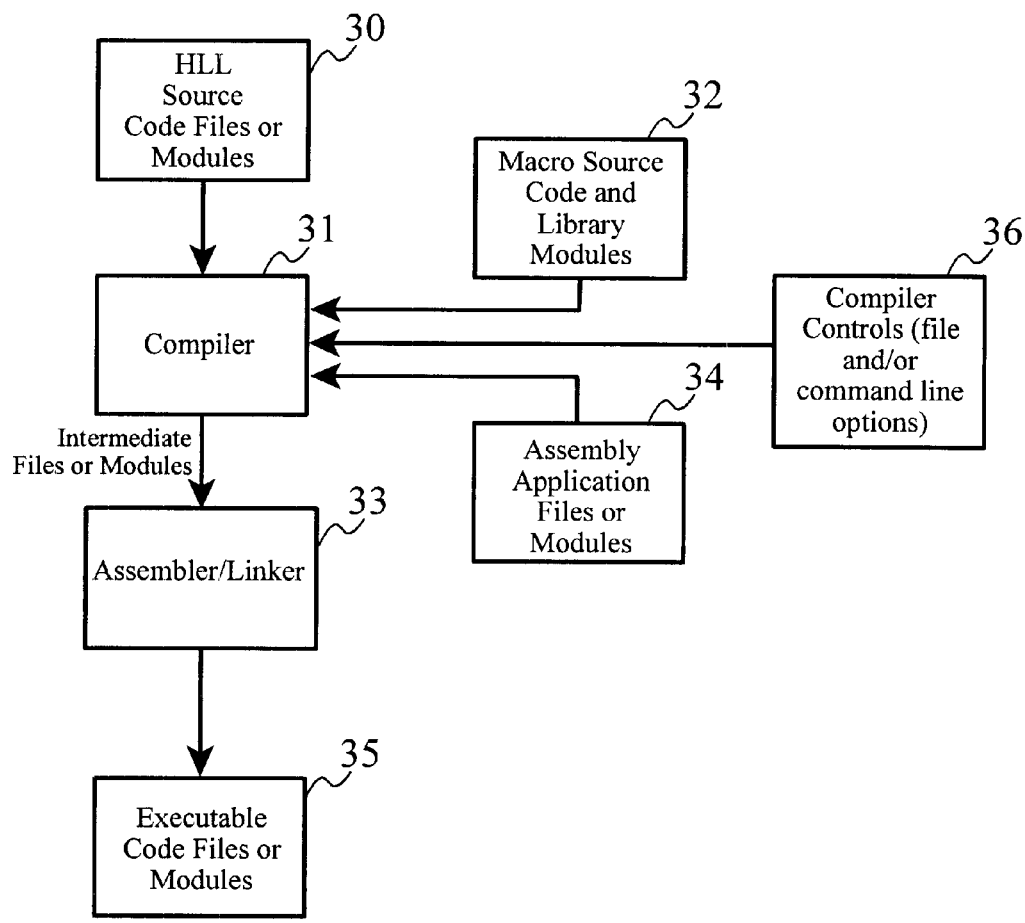
FIG. 3 shows the general process of compiling, assembling, linking and otherwise producing executable code from source code.

Turning to FIG. 3, the fundamental compiler and assembler process is shown. High-level source code (30), such as "C" code, is compiled (31) by initially performing syntactical analysis, converting the source code to a standardized or tokenized format, processing any compiler directives, expanding any macros (32), including assembly and other library routines (34) as indicated by the code, and generating an intermediate representation of the code, such as an object file. The compiling process is controlled by various compiler controls (36), such as a "make file" for compiling "C" code and command-line options to the compiling invocation. In the final phase, the various modules of code which are in intermediate form are "assembled" and "linked" (33) to create a run-time image of executable binary code (35) for a specific processor. This general process is followed by most compilers for most languages, and is well understood in the art.

In the preferred embodiment, the compiler is modified to include the inventive method to insert the stack cleaning code during the early phases of processing the HLL source into intermediate or assembly language form. This has several advantages. First, as all HLL is processed through this state, it allows the invention to be utilized on a wider array of source languages. Second, as assembly code is much more efficient than compiled HLL, the system performance impact of the code insertions is minimized by including the cleaning code as assembly code instead of HLL code or an HLL macro. However, in systems where run-time performance is not a primary concern, the cleaning code can be implemented as macro insertions in HLL. Therefore, the preferred embodiment process of compiling has the following steps:

(a) perform syntactical analysis on source code;

(b) convert source code to standard format;

(c) include library functions and expand macros as indicated by the source code;

(d) if global stack cleaning switch is selected, perform the following steps for all code, otherwise, perform the following steps for code surrounded by a enable-disable pair of compiler directives:

(1) scan code for "return" operations;

(2) for each "return" operation, calculate stack frame size used by examining arguments passed into and returned by the module, module local variable and transient data usage, processor context storage from the calling routine, and any other push and pop operations;

(3) for large stack frame sizes, insert code just prior to the "return" operation to save volatile registers and return parameters, to overwrite stack frame memory area using a repeated writing operation, and to restore volatile register values.

(4) for small stack frame sizes, insert code just prior to the "return" operation to save volatile registers and return parameters, to overwrite stack frame memory area using a multiple writing operations, and to restore volatile register values.

(5) scan code for "call" operations, and for each "call" operation, inject code following the "call" operation which re-initializes the stack space used to pass arguments to and receive returned arguments from the called routine, and to re-initialized the stack memory used to store the return address used by the called routine to return to the calling routine;

(e) produce intermediate code;

(f) assemble, link the intermediate code into executable code; and (g) output the executable code to a computer-readable medium.

For step (d), the preferred embodiment includes four types of compiler controls: a global control, a per-procedure control, an enable-disable pair, and a command line option. If a global control, such as:

pragma stack_clean_all is included in the compiler control file, all software will be processed and modified to include the stack cleaning method where applicable.

If a per-procedure control, such as:

pragma stack_clean_next_procedure is included in the compiler control file, only the code of the following procedure will be processed and modified to include the stack cleaning method where applicable.

If a compiler directive enable-disable control pair, such as:

```
#pragma stack_clean_on
...                       /* executable source code
#pragma stack_clean_off
``` is included in the source code, then only code located between the control pair will be processed and modified to include the stack cleaning method where applicable.

Alternatively, the global control can be set to enable the insertion of the stack cleaning code by a command line parameter upon invocation of the compiler, such as:

make control_file_name_clean_stack_all

It will be understood from the foregoing description that various modifications and changes may be made in the preferred embodiment of the present invention without departing from its true spirit, such as the use of alternate programming methodologies or languages, alternate microprocessor architectures, and software development tool sets. It is intended that this description is for purposes of illustration only and should not be construed in a limiting sense. The scope of this invention should be limited only by the language of the following claims.

What is claimed is:

1. A method of producing computer executable code for automatically clearing a computer program stack in computer memory, said program stack having a pointer which identifies a memory address value for a top of the stack, and said program stack being operable for storing and passing of data between calling and called processes and subroutines, said method comprising the steps of:

providing a computer program source code compiler having a user control to enable and disable automatic generation of executable code to clear computer stack memory;

receiving at least one computer program source code module and an associated user compiler control;

performing analysis on said computer program source code to find and identify instances of process and subroutine call and return operations; and inserting stack clearing computer program code into said computer program source code prior to return operations and following call operations such that when the modified computer program code is compiled and executed, stack memory utilized by called processes and subroutines will be cleared to prevent usage of residual data in the stack by other processes or subroutines, said insertion of stack clearing computer program code being inserted only if said user control indicates enablement of insertion of the code.

2. A method of producing computer executable code as set forth in claim 1 wherein the step of performing analysis to find and identify instances of process and subroutine call and return operations further comprises determining a stack frame size utilized by each called process and subroutine.

3. A method of producing computer executable code as set forth in claim 2 wherein the step of inserting stack clearing computer program code into said computer program source code prior to return operations and following call operations further comprises inserting stack clearing computer program code which clears the entire stack frame utilized by each called process or subroutine.

4. A method of producing computer executable code as set forth in claim 1 wherein said step of inserting stack clearing computer program code into said computer program source code prior to return operations further comprises inserting computer program code which clears stack memory of argument values conveyed by the calling process to each called process or subroutine using the stack memory.

5. A method of producing computer executable code as set forth in claim 1 wherein said step of inserting stack clearing computer program code into said computer program source code prior to return operations further comprises inserting computer program code which clears stack memory of local data values generated by each called process or subroutine using the stack memory.

6. A method of producing computer executable code as set forth in claim 1 wherein said step of inserting stack clearing computer program code into said computer program source code following call operations further comprises inserting computer program code which clears stack memory of processor context values stored in stack memory by calling processes or routines.

7. A method of producing computer executable code as set forth in claim 1 wherein said step of inserting stack clearing computer program code into said computer program source code following call operations further comprises inserting computer program code which clears stack memory of return address values conveyed to each called process or subroutine using the stack memory.

8. A method of producing computer executable code as set forth in claim 1 wherein said step inserting stack clearing computer program code into said computer program source code if said user compiler control indicates enablement of insertion of the code further comprises inserting stack clearing code into computer program source code between a pair of enabling and disabling user compiler controls.

9. A method of producing computer executable code as set forth in claim 8 wherein said step inserting stack clearing computer program code into said computer program source code between a pair of enabling and disabling user compiler controls further comprises receiving an enabling pragma control and a disabling pragma control.

10. A method of producing computer executable code as set forth in claim 1 wherein said step inserting stack clearing computer program code into said computer program source code if said user compiler control indicates enablement of insertion of the code further comprises inserting stack clearing code into computer program source code in all computer program source code if a user compiler control selects global insertion for all computer program source code.

11. A method of producing computer executable code as set forth in claim 1 further comprises the step of receiving a user compiler control included in a compiler control file.

12. A method of producing computer executable code as set forth in claim 1 further comprises the step of receiving a user compiler control included in compiler invocation command argument.

13. A computer program product for producing computer executable code for automatically clearing a computer program stack in computer memory, said program stack having a pointer which identifies a memory address value for a top of the stack, and said program stack being operable for storing and passing of data between calling and called processes and subroutines, said computer program product comprising:

a computer usable medium having computer readable compiler program code means embodied in said medium for compiling computer program source code, said compiler having a user compiler control to enable and disable automatic generation of executable code to clear computer stack memory;

a computer usable medium having computer readable program code means embodied in said medium for performing analysis of said computer program source code to find and identify instances of process and subroutine call and return operations; and a computer usable medium having computer readable compiler program code means embodied in said medium for inserting stack clearing computer program code into said computer program source code prior to return operations and following call operations such that when the modified computer program code is compiled and executed, stack memory utilized by called processes and subroutines will be cleared to prevent usage of residual data in the stack by other processes or subroutines, said insertion of stack clearing computer program code being inserted only if said user control indicates enablement of insertion of the code.

14. A computer program product for producing computer executable code for automatically clearing a computer program stack in computer memory as set forth in claim 13, wherein the computer readable program code means for performing analysis to find and identify instances of process and subroutine call and return operations further comprises computer readable program code means for determining a stack frame size utilized by each called process and subroutine.

15. A computer program product for producing computer executable code for automatically clearing a computer program stack in computer memory as set forth in claim 14, wherein the computer readable program code means for inserting stack clearing computer program code into said computer program source code prior to return operations and following call operations further comprises computer readable program code means for inserting stack clearing computer program code which clears the entire stack frame utilized by each called process or subroutine.

16. A computer program product for producing computer executable code for automatically clearing a computer program stack in computer memory as set forth in claim 13, wherein the computer readable program code means for inserting stack clearing computer program code into said computer program source code prior to return operations further comprises computer readable program code means for inserting computer program code which clears stack memory of argument values conveyed by the calling process to each called process or subroutine using the stack memory.

17. A computer program product for producing computer executable code for automatically clearing a computer program stack in computer memory as set forth in claim 13, wherein said computer program means for inserting stack clearing computer program code into said computer program source code prior to return operations further comprises computer program means for inserting computer program code which clears stack memory of local data values generated by each called process or subroutine using the stack memory.

18. A computer program product for producing computer executable code for automatically clearing a computer program stack in computer memory as set forth in claim 13, wherein said computer program means for inserting stack clearing computer program code into said computer program source code following call operations further comprises computer program means for inserting computer program code which clears stack memory of processor context values stored in stack memory by calling processes or routines.

19. A computer program product for producing computer executable code for automatically clearing a computer program stack in computer memory as set forth in claim 13, wherein said computer program means for inserting stack clearing computer program code into said computer program source code following call operations further comprises computer program means for inserting computer program code which clears stack memory of return address values conveyed to each called process or subroutine using the stack memory.

20. A computer program product for producing computer executable code for automatically clearing a computer program stack in computer memory as set forth in claim 13, wherein said user compiler control comprises a pair of enabling and disabling user compiler controls which enables insertion of stack clearing code into computer program source code located between said pair of enabling and disabling user compiler controls.

21. A computer program product for producing computer executable code for automatically clearing a computer program stack in computer memory as set forth in claim 20, wherein said pair of enabling and disabling user compiler controls further comprises an enabling pragma control and a disabling pragma control.

22. A computer program product for producing computer executable code for automatically clearing a computer program stack in computer memory as set forth in claim 13, wherein said user compiler control further comprises a global control which enable stack clearing code insertion for all computer program source code.

23. A computer program product for producing computer executable code for automatically clearing a computer program stack in computer memory as set forth in claim 13, wherein said user compiler control is disposed within a computer-readable compiler control file.

24. A computer program product for producing computer executable code for automatically clearing a computer program stack in computer memory as set forth in claim 13, further comprising computer program means disposed in a computer usable medium for receiving said user compiler control via a compiler invocation command argument.

25. A system for producing computer executable code from computer source code, and for automatically including executable code which clears computer program stack used by called processes and subroutines, said program stack being operable for storing and passing of data between calling and called processes and subroutines, said system comprising:

a computer suitable for compiling computer source code, said computer having a processor and computer-readable memory;

a compiler control; and a source code compiler disposed in a computer-readable memory and being executable by said computer, said source code compiler having an input for receiving computer source code to be compiled, and having an output for creating computer executable code, said source code compiler further having an analyzer for identifying program and subroutine call operations and return operations in computer source code, and having a code inserter which inserts program stack clearing code prior to return operations and following call operations in computer source code, said insertion being performed only if enabled by a compiler control.

26. A system for producing computer executable code from computer source code as set forth in claim 25, wherein said code inserter further comprises an inserter for code at a position within computer source code following a call operation to clear a return address value stored on the stack memory as a result of the call operation.

27. A system for producing computer executable code from computer source code as set forth in claim 25, wherein said code inserter further comprises an inserter for code at a position within computer source code following a call operation to clear processor context values stored on the stack memory as a result of the call operation.

28. A system for producing computer executable code from computer source code as set forth in claim 25, wherein said code inserter further comprises an inserter for code at a position within computer source code preceding a return operation to clear argument values passed to the called process by the calling process.

29. A system for producing computer executable code from computer source code as set forth in claim 25, wherein said code inserter further comprises an inserter for code at a position within computer source code preceding a return operation to clear local data values created by the called process.

30. A system for producing computer executable code from computer source code as set forth in claim 25, wherein said compiler control further comprises a pair of enable and disable commands which cause automatic insertion of stack clearing code into computer source code located between the enable and disable commands.

31. A system for producing computer executable code from computer source code as set forth in claim 25, wherein said pair of enable and disable commands comprises and enable pragma and a disable pragma.

32. A system for producing computer executable code from computer source code as set forth in claim 25, wherein said compiler control further comprises a global enable command which causes automatic insertion of stack clearing code into all computer source code compiled by the compiler.

33. A system for producing computer executable code from computer source code as set forth in claim 25, wherein said compiler control is disposed in a compiler control file embodied in a computer usable medium.

34. A system for producing computer executable code from computer source code as set forth in claim 25, further comprising a user input device through which said compiler control is specified.

35. A system for producing computer executable code from computer source code as set forth in claim 34, wherein said user input device further comprises a keyboard.

36. A system for producing computer executable code from computer source code as set forth in claim 34, where in said user input device further comprises a mouse.

* * * * *